(12) United States Patent
Sinatov

(10) Patent No.: US 11,111,853 B2
(45) Date of Patent: Sep. 7, 2021

(54) METHOD FOR EXHAUST WASTE ENERGY RECOVERY AT THE INTERNAL COMBUSTION ENGINE POLYGENERATION PLANT

(71) Applicant: Stanislav Sinatov, Kiryat Ono (IL)

(72) Inventor: Stanislav Sinatov, Kiryat Ono (IL)

(*) Notice: Subject to any disclaimer, the term of this patent is extended or adjusted under 35 U.S.C. 154(b) by 98 days.

(21) Appl. No.: 16/727,239

(22) Filed: Dec. 26, 2019

(65) Prior Publication Data
US 2020/0208574 A1 Jul. 2, 2020

Related U.S. Application Data

(60) Provisional application No. 62/784,855, filed on Dec. 26, 2018.

(51) Int. Cl.
| | | |
|---|---|---|
| *F02C 3/34* | (2006.01) | |
| *F01K 23/10* | (2006.01) | |
| *F02C 6/18* | (2006.01) | |
| *F02C 3/30* | (2006.01) | |
| *F02C 3/28* | (2006.01) | |

(52) U.S. Cl.
CPC .............. *F02C 3/34* (2013.01); *F01K 23/10* (2013.01); *B01D 2257/504* (2013.01); *F02C 3/28* (2013.01); *F02C 3/30* (2013.01); *F02C 6/18* (2013.01); *F02G 2280/20* (2013.01); *F05D 2260/61* (2013.01); *F05D 2270/08* (2013.01); *F25J 2210/42* (2013.01); *F25J 2240/70* (2013.01); *F25J 2240/82* (2013.01); *F25J 2270/14* (2013.01)

(58) Field of Classification Search
CPC ...... F02C 3/34; F02C 6/18; F02C 3/30; F02C 3/28; F01K 23/10; F01K 23/065; B01D 2257/504; F02G 2280/20; F05D 2260/61; F05D 2270/08; F25J 2240/70; F25J 2210/42; F25J 2270/14; F25J 2240/82; Y02E 20/32
See application file for complete search history.

(56) References Cited

U.S. PATENT DOCUMENTS

| | | | | |
|---|---|---|---|---|
| 7,191,736 | B2 * | 3/2007 | Goldman | ............... F02D 19/12 123/1 A |
| 7,827,794 | B1 * | 11/2010 | Pronske | ................... F02C 3/24 60/728 |
| 9,249,723 | B2 * | 2/2016 | Gulen | ...................... F02G 5/02 |
| 9,618,261 | B2 | 4/2017 | Huntington | |
| 10,473,029 | B2 * | 11/2019 | Conlon | ................. F25J 1/0228 |

* cited by examiner

*Primary Examiner* — Michael C Zarroli

(57) ABSTRACT

A method for exhaust waste energy recovery at the internal combustion engine polygeneration plant with the gas engine or gas turbine prime movers which includes supplying this plant with any on-site available methaneous gas (MG), converting from 20 to 30% of supplied MG into electric or mechanical power and producing a liquefied MG (LMG) co-product from the other 80-70% of supplied MG at a rate of 0.5-0.9 ton/h for each MW of engine output through converting and harnessing an engine exhaust as an effective refrigerant.

8 Claims, 3 Drawing Sheets

METHOD FOR EXHAUST WASTE ENERGY RECOVERY AT THE INTERNAL COMBUSTION ENGINE POLYGENERATION PLANT

CROSS-REFERENCE TO RELATED APPLICATIONS

This application claims the benefits of U.S. Provisional Application No. 62/784,855 filed on Dec. 26, 2018.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling the introduction of a new class of the polygeneration technologies, which, as known, are intended for high-efficient and low carbon emitting co-production of several energy outputs (power, heat, cold, $CO_2$, etc.) from one energy input (generally fossil or renewable fuel). More particularly, the present invention relates to the methods making possible to profitably produce power at the internal combustion engine (ICE) polygeneration plant with simultaneous liquefaction of any on-site available methaneous gas (MG) selected from the group comprising pipeline natural gas, biogas, landfill gas and coal-bed methane. It further relates to a method providing co-production of power and LMG at the ICE polygeneration plants with the gas turbine (GT) and gas engine (GE) prime movers at a sacrifice in a better recovery of exhaust waste energy of these prime movers, keeping their output and efficiency at the levels typical for operation in simple cycle operation mode.

BACKGROUND OF THE INVENTION

Recovering the exhaust waste energy at the ICE plants is well known and much used method for increasing the total fuel-to-useful energy conversion efficiency through co-production of an additional power in so-called bottoming cycles and/or through harnessing this waste energy for heating, cooling and other purposes. The recent development in this field described in the U.S. Pat. No. 9,618,261 extends the applicability of gas-fired ICE plant through using the ICE prime mover for simultaneous production of power and liquefaction of the pipeline natural gas (NG). Such approach could be profitably used either for production of an extra LNG at the specialized LNG plants using ICE for generation of a self-consumed power or for co-production of power and LNG at the polygeneration plants.

For realization of this approach, the NG liquefaction is proposed to perform with use of nitrogen ($N_2$) refrigerant, derived from the ICE exhaust gases containing only nitrogen ($N_2$), carbon dioxide ($CO_2$) and water vapor ($H_2O$). However, except for exhaust of the low-power rich burn reciprocating gas engines, the exhaust gases of the powerful ICEs (gas turbines and lean burn reciprocating gas engines which may be used in the proposed system), comprise also an oxygen ($O_2$) in amounts of 10% at least. Therefore, in the patent mentioned above converting the basic OT ICE from operation on an open Brayton cycle into its operation on a semi-closed Brayton cycle using exhaust gas recirculation (EGR) system and a steam bottoming cycle (StBC) is proposed. Operation of the plant in this case includes: compression of a full stream of exhaust gases in the first compressor, compression of a fresh air containing $N_2$ and $O_2$ in the second compressor, mixing a part of compressed exhaust gases with a pressurized fresh air and fuel, burning a fuel in the combustor in the near stoichiometric conditions, resulting in formation of combustion gases containing only $N_2$, $CO_2$ and $H_2O$, expansion of combustion gases in the first turbine expander, cooling the exhaust gases in the waste heat recovery boiler of StBC and returning the additionally precooled gases into first compressor. Another part of the compressed exhaust gases escaped the first compressor is cooled, cleaned from at least $H_2O$ components and used after expansion in the second turbine expander as refrigerant for the LNG liquefaction.

Although exhaust gas recirculation (EGR) is a known (but not commercially available up to now) approach to an increase in efficiency of GT ICE at the partial loads and to reduction in the $CO_2$ removal costs, the offered EGR application at a substantially stoichiometrically balanced condition may be a stubborn technical problem. According to many investigations performed, a recommended EGR ratio for the GT prime movers is between 30 and 50%, in so doing at the EGR-55% excess $O_2$ in exhaust gas at the combustor outlet is about 3%. At the same time a stable and complete combustion of fuel in the combustor may be provided at $O_2$ content of about 8%. By this means at the high EGR ratio a special design of combustor with oxygen enrichment of fuel mixture may be required, resulting in an enhanced plant complexity and extra capital costs.

It should be also considered that in such plant configuration the higher is EGR ratio, the lesser amount of exhaust gases may be used as a refrigerant for LNG production. For example, an increase in EGR ratio from 30% up to 50% leads to a decrease in the refrigerant flow-rate and amount of LNG produced by a factor of 2.3. Both of the proposed ways of compensation for the mentioned losses in LNG production are cumbersome and energy intensive. According to the first proposal, the plant should be equipped with an additional, separate $N_2$-based refrigeration loop being filled with the cleaned exhaust gases and including compressor, expander and heat exchangers. According to the second proposal, the exhaust dehydration equipment should be supplemented by the $CO_2$ removal system, consuming a significant amount of steam from the StBC. By this means an increase in LNG production through use of both proposals will be accompanied by a further increase in the plant capital cost and reduction in its power output and efficiency.

In addition, the differences in design and working principles of the ICEs like gas turbine and lean burn turbocharged reciprocating gas engine make impossible to apply the system proposed in the U.S. Pat. No. 9,618,261 to the latter ICE. Therefore, taking into account all of the above factors and considerations, there is demand for that method of co-producing the power and LNG at the ICE-based plants, which could be applied to the plants both with gas turbine and with gas engine prime movers and would make possible to use the exhaust gases stream as an effective refrigerant without cleaning the gases from the $O_2$ and $CO_2$ components. Apart from this, a new method should obviate a need for any changes in combustion process and basic design of the ICE and provide its output and efficiency at the levels at least inherent for ICE operation in the simple cycle operation mode. The mentioned goals may be achieved through a new approach to the exhaust waste energy recovery at the ICE polygeneration plants, which is selected as a subject for the development in the present invention.

SUMMARY OF THE INVENTION

In one or more embodiments, a proposed method for exhaust waste energy recovery at an ICE polygeneration plant may comprise in combination: a) supplying said polygeneration plant with a methaneous gas (MG) at a rate exceeding an amount of a fuel required for the ICE operation; b) processing all the supplied MG to meet the parameters and quality standards specified by its following liquefaction; c) selecting a type of the ICE for installation at the polygeneration plant from a group comprising a twin-shaft gas turbine and a lean burn supercharged reciprocating gas engine; d) supplying the polygeneration plant with an atmospheric air which is at least partially used as a combustion air in a selected ICE; e) pressurizing the combustion air with use of at least one compression means so providing a high pressure (HP) combustion air required for operation of the selected ICE; f) burning a mixture of said fuel and the HP combustion air with following expanding a formed combustion gas down to a low-pressure (LP) in said selected ICE, resulting in producing a first part of a gross power output of said polygeneration plant and releasing a low-pressure (LP) exhaust gases stream comprising a mixture of nitrogen, oxygen, carbon dioxide and water vapor at a high temperature; g) recovering an exhaust waste energy through producing a rest of the gross power output of said polygeneration plant, converting the LP exhaust gases stream into a useful refrigerant and using said refrigerant for producing a liquefied MG (LMG) co-product from a major part of a processed MG; h) harnessing a minor non-liquefied part of the processed MG as the fuel for the selected ICE; i) providing a net power output of the polygeneration plant at a level at a level which is equal to or above a power output of the selected ICE operated in a simple cycle mode; and j) providing a power output of the polygeneration plant recounted with consideration of a power equivalent of the LMG co-product at a level which is above a power output of the selected ICE operated in a conventional combined cycle mode.

In one or more embodiments, processing the supplied MG may comprise the following steps: a) dehydration the supplied MG; b) reducing a carbon dioxide content in the supplied MG down to a level selected in accordance with a rated pressure of said LMG co-product; c) selecting a value of a high pressure (HP) of the supplied MG prior to its liquefaction with regard to a pressure value of said LP exhaust gases stream released from the ICE; d) on-demand compressing the supplied MG up to the selected HP value, resulting in forming a HP MG stream; and e) pre-cooling said HP MG stream prior to its liquefying.

In one or more embodiments, producing the LMG co-product may comprise the following steps: a) liquefying the whole of said HP MG stream with use of the refrigerant formed from the LP exhaust gases stream, resulting in formation of a high-pressure liquefied MG (HP LMG) stream; b) two-stage depressurizing the HP LMG stream down to the rated pressure of the LMG co-product, resulting in forming a two-phase MG gas stream at said rated pressure; c) separating said two-phase liquefied MG gas stream into a vapor MG stream and a liquefied MG stream; d) using said vapor MG stream, as the non-liquefied part of the processed MG, for said pre-cooling the HP MG stream and fueling the ICE; and e) using said liquefied MG stream as the LMG co-product of the polygeneration plant.

In one or more embodiments, the following processes may be performed in deciding on the twin-shaft gas turbine as the ICE for the polygeneration plant: a) supplying the polygeneration plant with the atmospheric air which is pressurized up to a high pressure (HP) by a turbine compressor and completely used as the combustion air in said gas turbine; b) supplying the turbine combustor with the non-liquefied part of the processed MG as the fuel for the gas turbine; c) burning a mixture of said fuel and the HP combustion air in a turbine combustor with generating a combustion gases stream escaped the turbine combustor at the HP and a top cycle temperature; d) expanding the combustion gases down to a low pressure (LP) in the HP turbine expander, resulting in producing said first part of the gross power output of said polygeneration plant which is fully consumed by said turbine compressor; e) releasing the LP exhaust gases stream from the HP turbine expander at the high temperature; f) recovering a thermal energy of the LP exhaust gases stream in a heat recovery steam generator (HRSG) of a steam bottoming cycle, resulting in producing a second part of the gross power output of said polygeneration plant; and g) recovering a pressure energy of the LP exhaust gases stream in a LP expander, being performed as a part of converting the LP exhaust gases stream into the useful refrigerant and resulting in production of a third part of the gross power output of said polygeneration plant.

In one or more embodiments, the following processes may be performed in deciding on the lean burn supercharged reciprocating gas engine as the ICE for the polygeneration plant: a) supplying the polygeneration plant with the atmospheric air which is pressurized up to a low pressure (LP) by a separate LP air compressor; b) using a major part of a LP atmospheric air as a LP combustion air for said gas engine; c) supplying the gas engine with the non-liquefied part of the processed MG as the fuel for the gas engine; d) mixing the LP combustion air with said fuel and their following compressing in the gas engine up to a high pressure (HP); e) burning a HP mixture of said fuel and combustion air in said gas engine, resulting in generating a combustion gas at a top cycle pressure and a top cycle temperature; f) expanding the combustion gas down to a low pressure (LP) in the gas engine, resulting in producing said first part of the gross power output of said polygeneration plant and releasing the LP exhaust gases stream from the gas engine at the high temperature; g) recovering a thermal energy of the LP exhaust gases stream in the HRSG of the steam bottoming cycle, resulting in producing the second part of the gross power output of said polygeneration plant; h) mixing the LP exhaust gases stream escaped said HRSG with a minor part of the LP atmospheric air escaped said LP air compressor, resulting in forming a LP gaseous stream; i) recovering a pressure energy of the LP gaseous stream in a LP expander, being performed as a part of converting the LP gaseous stream into the useful refrigerant and resulting in production of the third part of the gross power output of said polygeneration plant; and j) consuming the second and third parts of the gross power output of said polygeneration plant for driving said LP air compressor.

In one or more embodiments, converting the LP exhaust gas stream into the useful refrigerant may comprise the following steps: a) cooling the LP exhaust gases stream escaped said HRSG by the water or atmospheric air with draining a formed condensate; b) drying the LP exhaust gases stream, resulting in capturing a water vapor in a pressure swing adsorber, and following chilling a dried LP exhaust gases stream below 0° C. in a cold regenerator so, forming a dried and chilled LP exhaust gases stream upstream of said LP expander, c) said expanding the dried and chilled LP exhaust gases stream in the LP expander, resulting in forming a deeply cooled non-pressurized exhaust gases stream, as the useful refrigerant, at the outlet of said LP expander, d) recovering a cold thermal energy of said refrigerant first for the producing the LMG co-product and then for said chilling the dried LP exhaust gases stream in the cold regenerator, e) using said refrigerant escaped the cold regenerator for removing the captured water vapor from the pressure swing adsorber; and f) exhausting the refrigerant together with the water vapor through use of an exhaust fan.

In one or more embodiments, converting the LP gaseous stream into the useful refrigerant may comprise the following steps: a) cooling the LP gaseous stream by the water or atmospheric air with draining a formed condensate; b) drying the LP gaseous stream, resulting in capturing a water vapor in a pressure swing adsorber, and following chilling a dried LP gaseous stream below 0° C. in a cold regenerator so, forming a dried and chilled LP gaseous stream upstream of said LP expander, c) said expanding the dried and chilled LP gaseous stream in the LP expander, resulting in forming a deeply cooled non-pressurized gaseous stream, as the useful refrigerant, at the outlet of said LP expander, d) recovering a cold thermal energy of said refrigerant first for the producing the LMG co-product and then for said chilling the dried LP gaseous stream in the cold regenerator, e) using said refrigerant escaped the cold regenerator for removing the captured water vapor from the pressure swing adsorber, and f) exhausting the refrigerant together with the water vapor through use of an exhaust fan.

In one or more embodiments, an enhanced yield of the LMG co-product of the polygeneration plant with the gas engine, as the selected ICE, may be achieved by increasing a flowrate of the refrigerant and performed through combination of the following processes: a) supplementary firing an additional fuel in the LP exhaust gases stream ahead of the HRSG; b) increasing a steam capacity of the HRSG, resulting in producing an extra power by a steam turbine of the steam bottoming cycle; c) increasing a flowrate value of said minor part of the LP atmospheric air produced by the LP air compressor and mixed with the LP exhaust gases stream escaped the HRSG; d) increasing a flowrate value of the dried and chilled LP gaseous stream at the inlet of the LP expander, resulting in producing an extra power by said LP expander; e) increasing a flowrate value of the deeply cooled non-pressurized gaseous stream, as the useful refrigerant, at the outlet of said LP expander, and f) serving the enhanced needs of the LP air compressor for a power input through using the extra power produced by the steam turbine and LP expander.

BRIEF DESCRIPTION OF THE DRAWINGS

Embodiments will hereinafter be described in detail below with reference to the accompanying drawings, wherein lie reference numerals represent like elements. The accompanying drawings have not necessarily been drawn to scale. Where applicable, some features may not be illustrated to assist in the description of underlying features.

DETAILED DESCRIPTION OF THE INVENTION

The practical realization of the proposed method for exhaust waste energy recovery at the ICE-based polygeneration plant may be performed through an innovative use of the ICE exhaust for liquefying up to from 75 to 85% of the methaneous gaseous (MG) fuel (pipeline natural gas, biogas, landfill gas and coal-bed methane) delivered into such plant. By this means the ICE-based polygeneration plant may be used for co-production of power and liquefied methaneous gas (LMG); in so doing the proposed on-site liquefaction of the MG at the plant may be performed in the pressure range of LMG co-product from 1.1 to 11 barA and is distinguished from LNG production at the specialized small-scale plants by much greater simplicity of the proposed process and its much higher efficiency. Taking into account that an energy intensity of the MG liquefaction process is particularly high at the small-scale LMG plants and that the invented method may fully obviate or minimize the energy consumption in this process, this method may be especially promising for co-production of the LMG at a rate of 0.4-1.0 t/h per each MW of the ICE prime mover output.

Figure 1:
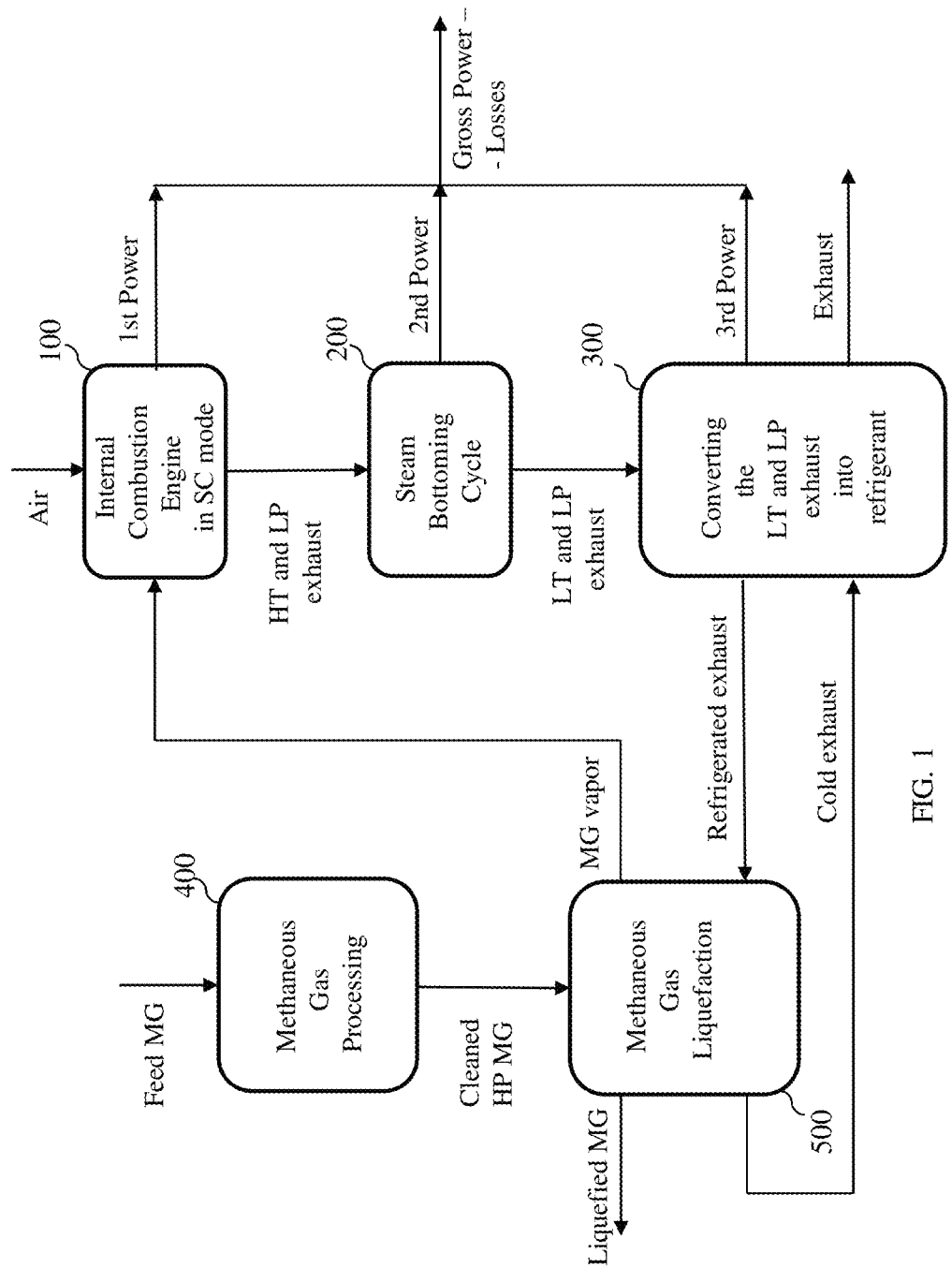
FIG. 1 is a block diagram of the internal combustion engine (ICE) polygeneration plant using the invented method of exhaust waste energy recovery for co-production of power and liquefied methaneous gas (LMG).

The FIG. 1 is a block diagram of the internal combustion engine (ICE) polygeneration plant, wherein the involved equipment packages are designed as 100—ICE package, 200—steam bottoming cycle package, 300—package of equipment intended for converting the ICE exhaust into a refrigerant, 400—MG processing package and 500—MG liquefaction package. The following special features are inherent in the proposed ICE polygeneration plant.

For installation at the plant, the ICE package 100 is selected from the group comprising a conventional twin-shaft gas turbine (GT) operated on an open Brayton cycle and a conventional lean burn supercharged reciprocating gas engine (GE). The selected ICE is supplied with the atmospheric air which is at least partially used as a combustion air in this engine. Pressurization of the combustion air up to a required high pressure (HP) is performed in the at least one compression device of the selected ICE. The ICE package 100 is also supplied with a fuel from the package 500. Burning a mixture of said fuel and a HP combustion air in the ICE leads to forming the HP combustion gases at a top cycle temperature. A partial expanding of these gases down to a low pressure (LP) is accompanied by production of the first part of a gross power output of said polygeneration plant and releasing a low-pressure (LP) exhaust gases stream comprising a mixture of nitrogen, oxygen, carbon dioxide and water vapor at a high temperature (HT). In so doing, a typical oxygen ($O_2$) content in the ICE exhaust represents 10% at least.

Recovering a thermal energy of the HT and LP exhaust gases stream is performed in the steam bottoming cycle package 200, which produces the second part of the gross power output of the polygeneration plant. The LP exhaust gases stream escaped the package 200 at a low temperature (LT) is further directed to the package 300, wherein the LT and LP exhaust gases stream is converted into a useful refrigerant. Converting process includes drying the LP exhaust gases in the pressure-swing adsorber (PSA), their chilling in the cold regenerator below 0° C. and expanding the chilled LP exhaust gases down to a near-atmospheric pressure. A deep cooling of the non-pressurized exhaust gases below −100° C. by the end of expanding process converts these gases into the useful refrigerant (refrigerated exhaust stream). In addition, the third part of the gross power output of the polygeneration plant is generated in the expanding process.

The polygeneration plant is supplied with the MG at a rate exceeding an amount of a fuel required for the ICE 100 operation by a factor of 4-5. Processing all the supplied MG is performed in the package 400 to meet the parameters and quality standards specified by a following MG liquefaction. At the small-scale LMG co-production the requirements for feed MG pre-treatment may be limited to MG drying and cleaning from the $CO_2$ component depending on a selected pressure of the LMG co-product usually enhanced up to 3-5 barA. A pressure of the processed MG upstream of its liquefaction is set up at a level equal or exceeding 60 barA. If a pressure of feed MG is below a mentioned value, processing the MG should also include compressing the cleaned MG stream up to a required high-pressure (HP) with aftercooling the HP MG stream.

Liquefying the cleaned HP MG stream is performed in the package 500. For these purposes, the refrigerated exhaust is directed to the package 500, wherein it is used as the useful refrigerant for liquefying the whole of the cleaned MG stream at the HP. Further depressurization of the HP LMG stream with separation of the two-phase depressurized stream lead to forming a liquefied MG co-product from a major part of a processed MG. A minor non-liquefied part of the processed MG is used as a fuel for the ICE and directed to the package 100. The refrigerant escaped the package 500 at a temperature of −40÷−60° C. is returned as a cold exhaust stream into package 300, wherein the rest of cold thermal energy of this stream is used for chilling the dried LP exhaust gases in the cold regenerator. Thereafter the exhaust gases together with the water vapor from the PSA are removed from the package 300.

A gross power output of the polygeneration plant is determined as a sum of the 1st, 2nd and 3rd parts mentioned above, whereas a net power output is determined as the gross power output minus mainly the air compression losses. As shown below, these losses include a power consumed by the HP compressor of the GT-based TCE and by the LP compressor of the GE-based ICE. The net power output of the polygeneration plant is provided at a level which is equal to or above a power output of the selected ICE 100 operated in the simple cycle (SC) mode. A re-counted power output of the polygeneration plant is determined as a sum of the net power output and a power equivalent of the liquefied MG co-product. For calculation of this power equivalent, an equation suggested by the Tractebel Engineering in 2015 may be used: $W_{LMG}=(998.4-39.5 \times G_{LMG}) \times G_{LMG}$, kW, where $G_{LMG}$, ton/h—hourly production of the liquefied MG. The re-counted power output of the polygeneration plant is provided at a level which is above a power of the selected ICE 100 operated in the conventional combined cycle (CC) mode.

Figure 2:
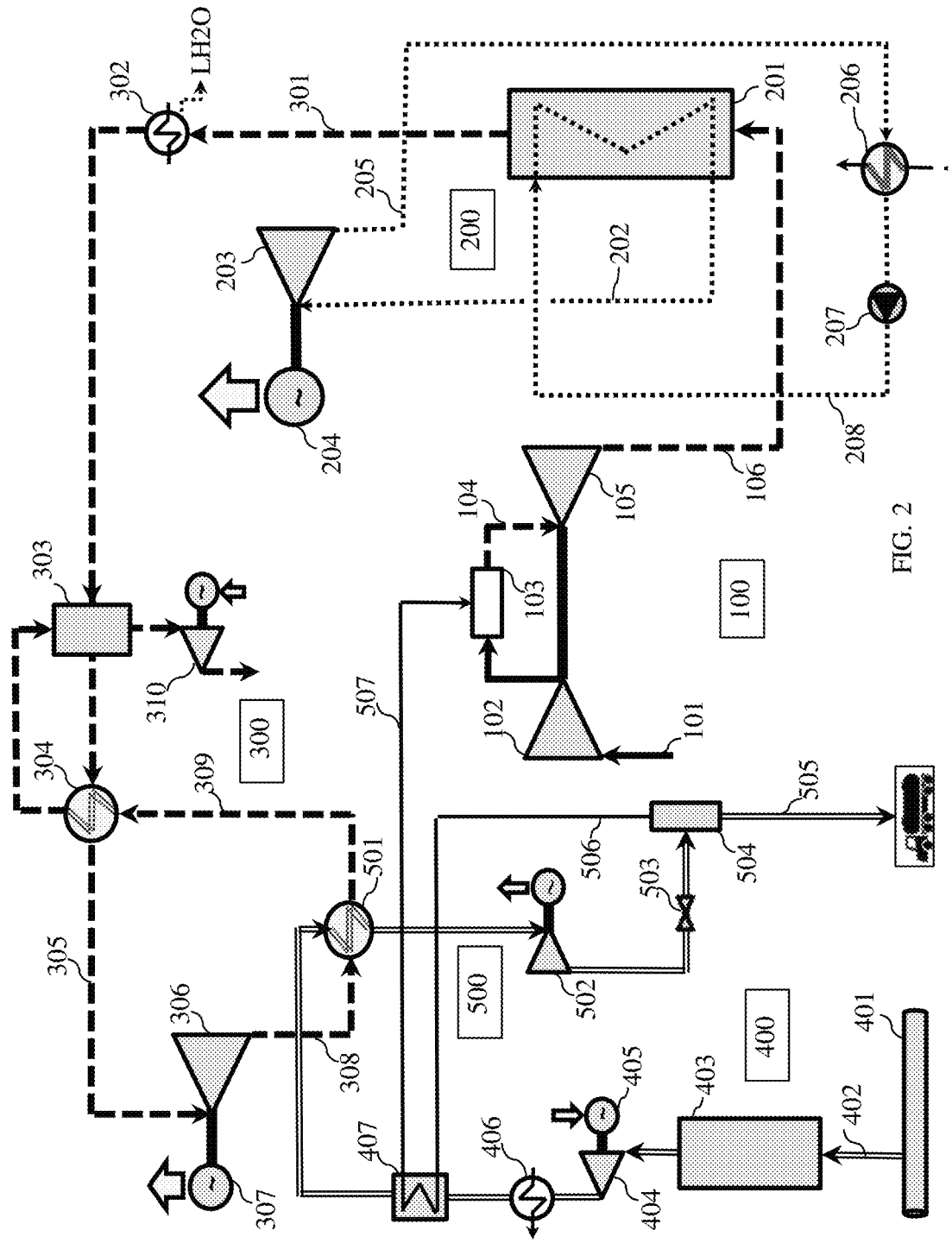
FIG. 2 is a schematic view of the ICE polygeneration plant with a twin-shaft gas turbine (GT) selected for installation at the plant.

The FIG. 2 is a schematic view of the ICE polygeneration plant using the invented method of exhaust waste energy recovery for co-production of power and LMG and equipped with a twin-shaft gas turbine (GT). Here the involved equipment packages are designed as 100—ICE package with combustion gases generator of twin-shaft GT, 200— steam bottoming cycle package, 300—package of equipment intended for converting the ICE exhaust into a refrigerant, 400—MG processing package and 500—MG liquefaction package.

The combustion gases generator of ICE package 100 is intended to supply the plant with a stream of the highly pressurized and hot combustion gases. It may be a standard piece of the commercially available twin-shaft GT operating on an open Brayton cycle. In this package the plant is supplied with an atmospheric air which is completely used as a combustion air in the GT, whereas pressurizing the combustion air up to a high pressure (HP) required for operation of the GT is directly performed with use of one compression means. For these purposes, the combustion air is captured from atmosphere via pipe 101, pressurized by high-pressure (HP) turbine compressor 102 and delivered into turbine combustor 103. The combustor also supplied with MG fuel, which is delivered from the liquefaction package 500 via pipe 509. The combustion gases generated in the combustor 103 are directed via pipe 104 to a high-pressure (HP) turbine expander 105, wherein they are expanded down a low-pressure (LP) with performing a work. The expander 105 and compressor 102 are placed on the common shaft and a mechanical work done by the expander 105 (the 1st part of the gross power output of the polygeneration plant) is entirely used for driving the HP compressor 102. The LP exhaust gases escape the HP expander at a high temperature via pipe 106 and directed to the steam bottoming cycle package 200.

Here a high-temperature part of thermal energy of the LP exhaust gases is converted into the 2nd part of gross power output of the polygeneration plant. Here a cooling of the LP exhaust gases is performed in the small-sized one pressure level heat recovery steam generator (HRSG) 201, resulting in producing a high-pressure superheated steam by this HRSG. The steam is delivered via pipe 202 into condensing steam turbine 203, wherein steam expansion leads to performing a mechanical work by this turbine. The electric generator 204 driven by the steam turbine 203 is used to convert a mechanical power produced by turbine into said 2nd part of the plant gross power output. The exhaust steam is directed via pipe 205 to the water or air-cooled condenser 206, from where condensate is delivered by high-pressure pump 207 via pipe 208 into the HRSG 201.

The package 300 is intended for converting the LP exhaust gases into the useful refrigerant, which may be used for liquefaction of supplied methaneous gas. The LP exhaust gases escaped the boiler 201 are directed to the package 300 via pipe 301 and heat exchanger 302, wherein they are firstly cooled down to a near ambient temperature with accompanied drainage of condensate ($LH_2O$) formed. The extracted heat is dissipated into surroundings or used for pre-heating the condensate returned into boiler 201.

From the heat exchanger 302 the LP exhaust gases with water vapor content not exceeding 0.5-0.8% (m/m) are directed to the first (working) chamber of a standard two-chamber pressure swing adcorber (PSA) 303, wherein the gases are cleaned from the water vapor component. The dried LP exhaust gases are further subjected to chilling down to −40+−50° C. in the cold regenerator 304 and directed via pipe 305 to the work-performing LP expander 306.

The dried and chilled LP exhaust gases are expanded in this expander 306 coupled with the generator 307, wherein mechanical work of expander is converted into 3rd part of the gross power output of the polygeneration plant. The expansion of LP exhaust gases is accompanied by their deep cooling significantly below −100° C., at which the formation of solid $CO_2$ (dry ice) in the stream of non-pressurized exhaust gases escaped the turbine 306 is however excluded. At the same time, a cold thermal energy of these non-pressurized gases is large enough to use them as refrigerant for liquefaction of a cleaned HP methaneous gas in the MG liquefier 501, where the refrigerant is directed via pipe 308.

The rest of a cold thermal energy of the non-pressurized exhaust gases escaped the MG liquefier 501 is recovered in the cold regenerator 304, where these gases are directed via pipe 309. Here this cold thermal energy is used for said chilling of the LP exhaust gases upstream of the expander 306. The non-pressurized exhaust gases outgoing from the cold regenerator 304 are used for purging the sorbent bed of the second chamber of the PSA unit 303 which is in regeneration operation mode. An electrically-driven exhaust fan 310 is used for removing the non-pressurized exhaust gases from the PSA device 303 into atmosphere.

The ICE polygeneration plant is supplied with a methaneous gas (MG) from the pipeline 401 at a pressure of feed MG in this pipeline. During plant operation all delivered MG is directed via pipe 402 to a pre-treatment unit 403, wherein the MG is subjected to dehydration and cleaning from $CO_2$ and, if needed, from the aromatic and paraffin hydrocarbons. If a pressure of supplied MG is below 60 barA, a cleaned MG is further compressed up to a high pressure (HP) of 60-100 barA in the MG compressor 404 driven by a motor 405. A temperature of this cleaned HP MG is further reduced in the conventional gas cooler 406 down to a value close to a temperature of atmospheric air. Following pre-cooling the cleaned HP MG upstream of the MG liquefier 501 is performed in the cold MG vapor recuperator 407, resulting in reducing a HP MG temperature below 0° C.

At this temperature the cleaned and pre-cooled HP MG is directed to the gas liquefier 501, wherein full MG liquefaction is performed through recovering a cold thermal energy of the refrigerant—deeply cooled non-pressurized exhaust gas. The HP liquefied methaneous gas (HP LMG) outgoing from liquefier 501 is first reduced in pressure in the work-performing LMG expander 502 and thereafter it is depressurized down to a selected low pressure (LP) in the Joule-Thompson valve 503. A liquefied two-phase LP MG stream outgoing from the JTV device is separated in the MG separator 504 into a stream 505 recovered as LP-LMG co-product of the polygeneration plant and a MG vapor stream 506 used as fuel for the GT ICE 100. A cold thermal energy of the MG vapor stream 506 is recovered in the cold MG vapor recuperator 407 for said pre-cooling of the HP MG stream Since the selected low pressure of the LP-LMG co-product is usually below a high pressure of combustion air in the turbine combustor 103, a fuel compressor installed in the pipe 507 (not shown) is used to provide a required fuel pressure at the GT inlet.

A total net power output of the plant with the GT, as the selected ICE, is equal to a sum of the power outputs of steam turbine 203, LP exhaust expander 306 and LMG expander 502 minus power consumed by the auxiliary equipment (MG compressor 404, water pump 207, exhaust fan 310 and GT fuel compressor). This makes possible to supply a grid with a plant power output, which is equal to or above a power output of the GT 100 operated in the simple cycle (SC) mode and simultaneously to co-produce up to 1.0 t/h of the LMG co-product per each MW of the plant output. In so doing, any consumption of an additional fuel for the co-production of power and LMG at such plant is obviated.

Figure 3:
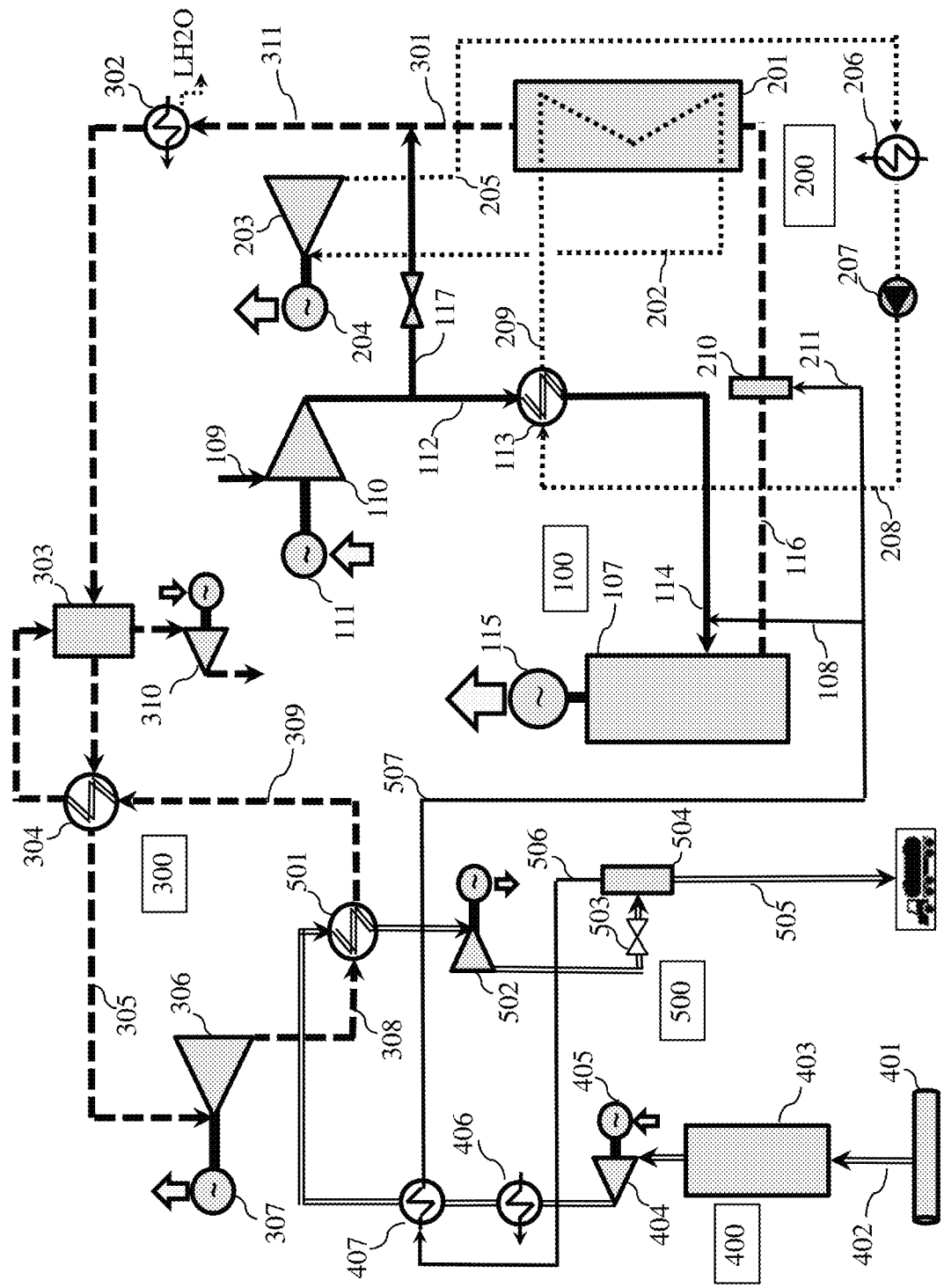
FIG. 3 is a schematic view of the ICE polygeneration plant with a lean burn supercharged reciprocating gas engine (GE) selected for installation at the plant.

FIG. 3 is a schematic view of the ICE polygeneration plant using the invented method of exhaust waste energy recovery for co-production of power and LMG and equipped with a gas engine (GE). Here the involved equipment packages are designed as 100—ICE package with the GE, 200—steam bottoming cycle package, 300—package of equipment intended for converting the ICE exhaust into a refrigerant, 400—MG processing package and 500—MG liquefaction package.

In the package 100 the plant is supplied with an atmospheric air, a major part of which is used as a combustion air in the GE, whereas a minor part (up to 13%) of the supplied air bypasses the GE and is mixed with the LP exhaust gases downstream of the HRSG. In so doing, pressurizing the combustion air up to a high pressure (HP) required for operation of the GE is performed with use of two compression means. For these purposes, all the supplied air is captured from atmosphere via pipe 109 and pressurized up to a low pressure (LP) by the LP compressor 110 coupled with the electric motor 111. This compressor is used as the first compression means. A part of LP air escaped the LP air compressor 110 and used as a combustion air is delivered first via pipe 112 into the high-temperature (HT) combustion air cooler 113 and thereafter via pipe 114 into the cylinders of the GE 107. At the GE inlet the LP combustion air is mixed with the fuel delivered via pipe 108 from the package 500. Further pressurizing a mixture of combustion air and fuel up to a required HP is performed inside of the cylinders of GE 107, wherein the engine pistons are used as the second compression means. A work-performing expanding the combustion gases, which formed during Burning the air-fuel mixture results in formation of the combustion gases, which are expanded down to a low-pressure (LP) inside the engine cylinders with performing a mechanical work. This work is converted into an electric power by a generator 115 and constitutes the first part of gross power output of the polygeneration plant.

The LP exhaust gases escape the GE cylinders via a pipe 116 and are directed to the HRSG 201 of the steam bottoming cycle package 200. Operating the equipment of this package is performed similarly to that described as applied to the FIG. 1. The distinction consists only in preheating the feed water in the HT air cooler 113 upstream of the HRSG 201. The LP exhaust gases escaped said HRSG via a pipe 301 are mixed with a minor part of the LP atmospheric air delivered from the LP air compressor 110 via a pipe 117. Via a pipe 311 the formed LP gaseous stream is directed to the heat exchanger 302 which is a part of the package 300. This package is intended for converting the LP gaseous stream into the useful refrigerant, which may be used for liquefaction of supplied methaneous gas. Operating the equipment of package 300 is performed similarly to that described as applied to the FIG. 1. The design of two other packages 400 and 500 and operating their equipment are similar to those described as applied to the FIG. 1. However, since the selected low pressure of the LP-LMG co-product is selected close to or above a low pressure of combustion air delivered into engine 107, installation of the fuel compressor in the pipe 507 is usually not required.

A total net power output of the plant with the GE, as the selected ICE, is equal to a sum of the power outputs of gas engine 107 itself, steam turbine 203, LP exhaust expander 306 and LMG expander 502 minus power consumed by the LP air compressor 110 and auxiliary equipment (MG compressor 404, water pump 207 and exhaust fan 310). This makes possible to supply a grid with a plant power output, which is equal to or above a power output of the GE 107 operated in the simple cycle (SC) mode and simultaneously to co-produce up to 0.6 t/h of the LMG co-product per each MW of the plant output. In so doing, any consumption of an additional fuel for the co-production of power and LMG at such plant is obviated.

A specific rate of the LMG co-product at the GE-based polygeneration plant is less than that at the GT-based plant by a factor of 1.5-1.8. The main reason is a much lower specific combustion air consumption (kg of air/kWh) inherent in the gas engine. This leads to a correspondingly much lower specific flowrate of the refrigerant, formed from the GE exhaust gases and available for MG liquefaction. Under these conditions, some increase in specific rate of the LMG co-product at the GE-based plant may be achieved through an increase in capacity of the LP air compressor 110. This makes possible to correspondingly increase a flowrate of LP atmospheric air, which bypasses the GE 107 via a pipe 117 and does not participate in combustion process, but may be used as the useful refrigerant for MG liquefaction in the liquefier 501. As shown in FIG. 3, a supplementary firing of a small amount of the MG fuel in the LP exhaust gases stream 116 downstream of the GE 107 may be performed for these purposes, Burning this fuel delivered via a pipe 211 into a duct burner 210 leads to an increase in temperature of the LP exhaust gases stream upstream of HRSG 201 by 50-150° C. This provides an enhancement of steam bottoming cycle capacity and an increase in amount of power available for driving the LP air compressor. An increase in flowrate of LP gaseous stream through the LP exhaust expander also leads to producing the extra power by this expander. By and large the described approach provides an increase in specific rate of the LMG co-product at the GE-based plant up to a level approximating that at the GT-based plant. In so doing, a relative amount of the fuel self-consumed for LMG co-production is in the range from 1.3 to 2.6%, what is several times less than a fuel self-consumption at the conventional small-scale LNG plants comparable in capacity.

INDUSTRIAL APPLICABILITY

The performances of two ICE polygeneration plants using the twin-shaft gas turbines (GT), as the selected prime movers operated on an open Brayton cycle, are presented below. Apart from the different power outputs and simple cycle (SC) efficiencies, these GT movers differ in pressure ratio ($\pi$=10:1 and 14.9:1) and specific combustion air consumption (SCAC=16.1 and 12.4 kg/kWh) correspondingly. A tentative estimation of the combustion gases generation in these turbines shows that an energy of high-pressure (HP) combustion gases escaped the turbine combustor at a top temperature of ~960-1130° C. is partially recovered by HP turbine expander, driving the HP turbine compressor. The low-pressure (LP) exhaust gases escape the HP turbine expander at a high temperature of ~690-800° C. and a pressure of ~3-3.7 barA. According to the proposed method for exhaust waste energy recovery, the thermal energy of the LP exhaust gases is first used in the simplest one pressure level steam bottoming cycle, wherein a small-sized pressurized heat recovery steam generator (HRSG) is installed downstream of the HP turbine expander (see FIG. 2). In so doing, the power output of steam bottoming cycle at the GT polygeneration (GT PG) plants exceeds that of conventional combined cycle (GT CC) plants with a non-pressurized HRSG by a factor of 2 and comprises up to 86-88% of a total plant power output.

The energy of LP exhaust gases escaped the HRSG is further used in the exhaust gases energy recovery package for an additional power generation and on-site generation of the liquefied natural gas (LNG) co-product. This is performed through: a) reducing a temperature of the LP exhaust gases down to ~25° C. in the conventional water- or air-cooled heat exchanger equipped with condensate drainage device; b) further dewatering the exhaust gases in the working chamber of the conventional pressure swing adsorber (PSA); c) chilling the exhaust gases down ~-60° C. in the cold regenerator; d) expansion of exhaust gases in the LP turbine expander down to a near atmospheric pressure, resulting in their deep cooling down to ~-113° C.; e) recovering the most of cold thermal energy of deeply cooled exhaust gases for NG liquefaction; and f) recovering the remainder of cold thermal energy of the exhaust gases escaped the NG liquefier for chilling the LP exhaust gases in the cold regenerator. It should be stressed that mole $CO_2$ content in the stream of deeply cooled exhaust gases at the outlet of LP turbine expander does not exceed 3.5%. Therefore, at the temperatures of this stream mentioned above formation of dry ice in it is eliminated. A mechanical work of the LP turbine expander is converted into a minor part of a total GT PG plant power output measuring 12-14%.

The GT PG plants may be designed for operation at any pressure of the feed NG which is usually in excess of 5-10 barA. But in any case, a pressure of this NG at the inlet of the liquefier should be maintained at a level of 60 barA or above. At the plants described above the feed NG pressure is selected at a level of 60 barA typical for the pressure in the NG main pipelines. At the same time the NG compressor is used to enhance the NG pressure upstream of the liquefier up to 80 barA. The GT PG plants may be also designed for operation at any pressure of the LNG co-product selected in the range from 1.1 to 11 barA. At the plants described above the feed NG pressure is selected at a level of 5.1 barA, which lies in the typical range of the pressures of pressurized LNG produced at the small-scale LNG plants. Such somewhat enhanced pressure of the LNG co-product provides also minimization of the requirements placed upon the NG pre-treatment and significantly reduces an energy intensity of the NG liquefaction.

In many cases the co-production of LNG at the proposed GT PG plants may profitably replace the NO liquefaction at the specialized small-scale (SS) LNG plants. For the most part these plants are using nitrogen expansion technology characterized by a high energy intensity, or in other words by a high specific power consumption (SPC) measured in kWh/ton of LNG. In addition, the SPC value at the SS LNG plants is significantly increased with decreasing in designed production rate of such plant. Using data of the Tractebel Engineering, it is seen that the SS LNG plant designed for annual production of 100 kton of LNG operates at the SPC-524 kWh/t and consumes 6.3 MW of electric power, whereas the SS LNG plant designed for annual production of 25 kton of LNG operates at the SPC-880 kWh/t and consumes 2.6 MW. In other words, the decrease in designed LNG production at the SS LNG plant by a factor of 4 leads to decrease in amount of power consumed at this plant by a factor of 2.4 only. It immediately follows that the smaller is a capacity of the SS LNG plant being replaced by the GT PG plant, the higher is a profit obtained from such replacement. In so doing, a power equivalent of the LNG co-product at the GT PG plant is assumed to be equal to the power consumed by the conventional LNG plant. In this case, the summation of electric power output of the GT PG plant and the mentioned power equivalent of the LNG co-product at this plant makes possible to determine a total (so-called re-counted) power output of the GT PG plant. In its turn, division of re-counted power output of the GT PG plant by a thermal equivalent of fuel consumed by gas turbine makes possible to determine a total (so-called re-counted) efficiency of the GT PG plant, as a measure of its fuel-to-power conversion efficiency.

The performances of GT PG plants using NG as pure methaneous ($CH_4$) fuel are presented in the Tables 1-2. The performances of these plants are compared to those of the plants with twin-shaft gas turbines operated in the simple cycle (GT SC) and in the standard combined cycle (GT CC), having one pressure level heat recovery steam generator installed downstream of LP turbine expander. The presented data are a good evidence that the invented method for exhaust waste energy recovery may provide the following benefits of the GT PG plants for the Independent Power Producers and LNG plants operators: a) co-production of 0.91-0.93 ton of LNG per each MWe of plants output without consumption of an additional fuel and without use of the specialized equipment and refrigerants; b) an increase in electric output of the plants by 12-14% without any changes in combustion process and design of the combustion gases generators; and c) an increase in total plants fuel conversion efficiency by 7.3-11.9 points, as compared to an efficiency of the GT power plants in CC operation mode. As a whole, the GT-PG plants may be used to profitably liquefy 79-80% of the fuel delivered into the plant, whereas the rest of fuel is consumed for production of a power delivered into the grid.

The performances of the ICE polygeneration plant using the lean burn supercharged reciprocating gas engine (GE), as the selected prime mover, are presented below. Apart from a much higher efficiency in simple cycle (SC) operation mode, this type of prime mover is different from the GT one in a much lower specific combustion air consumption, which is equal to SCAC=~5.6 kg/kWh. The combustion air from the atmosphere is pressurized by LP compressor driven by the LP exhaust compressor and delivered together with the fuel into the GE cylinders. Here the air-fuel mixture is further pressurized, burnt and expanded with performing a work, which is converted into a GE power output by the electric generator. A tentative estimation of these processes shows that the low-pressure (LP) exhaust gases escape the GE cylinders at a high temperature of ~535° C. and a pressure of ~3.6 barA. In the conventional SC and CC operation modes, about 80% of these gases are expanded in the mentioned LP exhaust expander installed downstream of the GE cylinders and escape said expander after mixing with the bypassed gases at ~390° C. and at near-atmospheric pressure. In the conventional CC operation mode, a thermal energy of these non-pressurized exhaust gases is further used in the bottoming cycle, providing an increase in plant output by 9-10%.

In the invented method for exhaust waste energy recovery, a thermal energy of LP exhaust gases is first recovered in the simplest one pressure level steam bottoming cycle, wherein a small-sized pressurized HRSG is installed downstream of the GE cylinders (see FIG. 3). In so doing, the power output of steam bottoming cycle at the GE polygeneration (GE PG) plants exceeds that of conventional combined cycle (GE CC) plants with a non-pressurized HRSG by a factor of 2 and is completely used for driving the LP air compressor. The said LP air compressor is designed for pressurizing the captured atmospheric air in the amount exceeding that required for combustion of fuel in the GE by ~13%. The excessive LP air bypasses the GE and HRSG and is mixed with the LP exhaust gases escaped the HRSG. The energy of LP mixed gaseous stream is further used in the proposed energy recovery package for an additional power generation and on-site generation of the liquefied natural gas (LNG) co-product. The conducted processes and the parameters of the NG-to-LNG conversion equipment are similar to those described above, as applied to the GT PLO plants. The sole

TABLE 1

| Parameters | Unit | GT SC | GT CC | GT PG |
|---|---|---|---|---|
| Pressure ratio | — | 10:1 | 10:1 | 10:1 |
| Combustion air flow-rate | kg/s | 45.8 | 45.8 | 45.8 |
| Mechanical power consumed by air compressor | MWm | 14.92 | 14.92 | 14.92 |
| Heat input in the GT combustor | MWth | 34.54 | 34.54 | 34.54 |
| Combustion gases pressure at HP expander inlet | barA | 9.7 | 9.7 | 9.7 |
| Combustion gases temperature at HP expander inlet | ° C. | 956 | 956 | 956 |
| Combustion gases flow-rate at HP expander inlet | kg/s | 46.5 | 46.5 | 46.5 |
| Mechanical power produced by HP expander | MWm | 14.93 | 14.93 | 14.93 |
| Exhaust gases pressure at LP expander inlet | barA | 2.95 | 2.95 | 2.83 |
| Combustion gases temperature at LP expander inlet | ° C. | 690 | 690 | −67 |
| Exhaust gas temperature at LP expander outlet | ° C. | 490 | 494 | −112 |
| Exhaust gas temperature at plant outlet | ° C. | 490 | 189 | 23 |
| Electric power produced by LP expander | MWe | 10.26 | 10.10 | 1.88 |
| Electric output of 1PL steam bottoming cycle | MWe | — | 4.95 | 10.06 |
| Inlet pressure of NG supplied | barA | 60 | 60 | 60 |
| NG pressure at liquefier inlet | barA | — | — | 80 |
| Pressure of LNG produced | barA | — | — | 5.1 |
| Power consumed by NG compressor | MWe | — | — | 0.16 |
| Power produced by LNG expander | MWe | — | — | 0.05 |
| Power consumed by exhaust fan | MWe | — | — | 0.05 |
| Power consumed by GT fuel compressor | MWe | — | — | 0.12 |
| SC/CC/PG plant electric output | MWe | 10.26 | 15.05 | 11.66 |
| Mole composition of exhaust gases, as refrigerant: | | | | |
| N2 | % | — | — | 80.3 |
| Ar | % | — | — | 1.0 |
| O2 | % | — | — | 15.8 |
| CO2 | % | — | — | 2.9 |
| Hourly LNG co-production rate | t/h | — | — | 9.54 |
| Specific LNG co-production | t/MWh | — | — | 0.93 |
| Annual total LNG co-production at 8322 h/y | kton/y | — | — | 79.4 |
| NG liquefaction rate | % | — | — | 78.9 |
| Plant output: SC/CC/PG (re-counted) | MWe | 10.26 | 15.05 | 17.59 |

TABLE 1-continued

| Parameters | | Unit | GT SC | GT CC | GT PG |
|---|---|---|---|---|---|
| Plant efficiency: SC/CC/PG (re-counted) | | % | 29.7 | 43.6 | 50.9 |
| Referenced LNG plant capacity | | t/h | | | 9.54 |
| Specific power consumption at referenced plant | | kWh/t | | | 622 |
| Alt. 1 | Power consumption from the grid | MWe | | | 5.93 |
| | Assumed efficiency of own GT | % | | | 32.5 |
| Alt 2 | Share of delivered NG consumed by GT | % | | | 13:6 |

TABLE 2

| Parameters | Unit | GT SC | GT CC | GT PG |
|---|---|---|---|---|
| Pressure ratio | — | 14.9:1 | 14.9:1 | 14.9:1 |
| Combustion air flow-rate | kg/s | 19.34 | 19.34 | 19.34 |
| Mechanical power consumed by air compressor | MWm | 7.95 | 7.95 | 7.95 |
| Heat input in the GT combustor | MWth | 17.33 | 17.33 | 17.33 |
| Combustion gases pressure at HP expander inlet | barA | 14.1 | 14.1 | 14.1 |
| Combustion gases temperature at HP expander inlet | °C. | 1128 | 1128 | 1128 |
| Combustion gases flow-rate at HP expander inlet | kg/s | 19.7 | 19.7 | 19.7 |
| Mechanical power produced by HP expander | MWm | 7.96 | 7.96 | 7.96 |
| Exhaust gases pressure at LP expander inlet | barA | 3.7 | 3.7 | 3.6 |
| Exhaust gases temperature at LP expander inlet | °C. | 803 | 803 | −57 |
| Exhaust gases temperature at LP expander outlet | °C. | 551 | 555 | −113 |
| Exhaust gases temperature at plant outlet | °C. | 551 | 162 | 24 |
| Electric power produced by LP expander | MWe | 5.62 | 5.55 | 1.00 |
| Electric output of 1PL steam bottoming cycle | MWe | — | 2.77 | 5.47 |
| Inlet pressure of NG supplied | barA | — | — | 60 |
| NG pressure at liquefier inlet | barA | — | — | 80 |
| Pressure of LNG produced | barA | — | — | 5.1 |
| Power consumed by NG compressor | MWe | — | — | 0.09 |
| Power produced by LNG expander | MWe | — | — | 0.03 |
| Power consumed by exhaust fan | MWe | — | — | 0.02 |
| Power consumed by GT fuel compressor | MWe | — | — | 0.09 |
| SC/CC/PG plant electric output | MWe | 5.62 | 8.32 | 6.30 |
| Mole composition of exhaust gases, as refrigerant: | | | | |
| N2 | % | — | — | 80.8 |
| Ar | % | — | — | 1.0 |
| O2 | % | — | — | 14.8 |
| CO2 | % | — | — | 3.5 |
| Hourly LNG co-production rate | t/h | — | — | 5.13 |
| Specific LNG co-production | t/MWh | — | — | 0.91 |
| Annual total LNG co-production at 8322 h/y | kton/y | — | — | 42.7 |
| NG liquefaction rate | % | — | — | 80.0 |
| Plant output: SC/CC/PG (re-counted) | MWe | 5.62 | 8.32 | 10.38 |
| Plant efficiency: SC/CC/PG (re-counted) | % | 32.5 | 48.0 | 59.9 |
| Referenced LNG plant capacity | t/h | | | 5.13 |
| Specific power consumption at referenced plant | kWh/t | | | 796 |
| Alt. 1   Power consumption from the grid | MWe | | | 4.08 |
|             Assumed efficiency of own GT | % | | | 31.0 |
| Alt 2   Share of delivered NG consumed by GT | % | | | 18.1 | difference is in using a power output of the LP expander for driving the LP air compressor and plant auxiliaries, instead of delivering this output into a grid.

The performances of GE PG plant using NG as pure methaneous ($CH_4$) fuel are presented in the Table 3. The performances of these plants are compared to those of the plants with GE prime mover operated in the simple cycle (GE SC) and in the standard combined cycle (GE CC), having one pressure level heat recovery steam generator installed downstream of LP turbine expander. The presented data are a good evidence that the invented method for exhaust waste energy recovery may provide the following benefits of the GE PG plant for the Independent Power Producers and LNG plants operators: a) co-production of 0.51 ton of LNG per each MWe of plant output without consumption of an additional fuel and without use of the specialized equipment and refrigerants; b) providing an electric output of the GE PL plant at the level inherent for the GE SC plant without any changes in the design of the basic GE; and c) an increase in total plants fuel conversion efficiency by 14.2 points, as compared to an efficiency of the GE power plants in CC operation mode. As a whole, the GE-PG plants may be used to profitably liquefy 76% of the fuel delivered into the plant, whereas the rest of fuel is consumed for production of a power delivered into the grid.

At the same time, a specific rate of LNG co-production at the GE PG plants is less than that at the GT PG plants by a factor of ~1.8. This is caused by the mentioned much lower SCAC value inherent in the GE prime mover. The proposed method makes possible to enhance the LNG co-production at the GE PG plants through an increase in amount of the LP air, which is produced by the LP air compressor, bypassed the GE and WHRSG and used as refrigerant in the LNG co-production. For these purposes, the supplementary firing (SF) of a small amount of an additional fuel in the duct burner installed between the GE and HRSG is performed (see FIG. 3). Rising a temperature of the LP exhaust gases at HRSG inlet leads to production of an extra power by the steam bottoming cycle. In addition, a higher flowrate of mixed air-exhaust gases through the LP expander also leads to production of an extra power by this expander. Most of the extra power produced by the ST of bottoming cycle and LP exhaust expander is spent by the LP air compressor, resulting in an increase in an outlet LP air flowrate.

The calculated performances of the GE PG plant with SF are presented below in the Table 4 and may be compared with the performances of this plant without SF presented in the Table 3. A step-by-step increase in amount of fuel consumed by the duct burner provides a rising of the LP exhaust gases temperature at the HRSG inlet from 535° C. up to 595° C., 645° C. and 695° C. This leads to a corresponding increase in flowrate of the air-exhaust gases mixture at the NG liquefier inlet from 16.31 kg/s up to 20.24, 25.17 and 28.83 kg/s, resulting in

TABLE 3

| Parameters | Unit | GE SC | GE CC | GE PG |
|---|---|---|---|---|
| Pressure ratio | — | 3.92:1 | 3.92:1 | 3.92:1 |
| Low-pressure air flowrate | kg/s | 15.1 | 15.1 | 17.0 |
| Mech/Electric power spent by LP air compressor | MW | 2.52 | 2.52 | 2.92 |
| Heat input in the GE cylinders | MWth | 21.02 | 21.02 | 21.02 |
| Exhaust gases flowrate at the GE cylinders outlet | kg/s | 15.53 | 15.53 | 15.53 |
| Electrical power produced by GE | MWe | 9.73 | 9.73 | 9.73 |
| Exhaust gases pressure at GE cylinders outlet | barA | 3.62 | 3.62 | 3.62 |
| Exhaust gases temperature at GE cylinders outlet | ° C. | 535 | 535 | 535 |
| Exhaust gases pressure at LP G expander inlet | barA | 3.6 | 3.6 | 3.53 |
| Exhaust gases temperature at LP expander inlet | ° C. | 535 | 535 | −43 |
| Exhaust gas temperature at LP expander outlet | ° C. | 390 | 390 | −103 |
| Mech/Electric power produced by LP expander | MWe | 2.56 | 2.56 | 0.96 |
| Exhaust gas temperature at 1 PL HRSG inlet | ° C. | — | 390 | 535 |
| Exhaust gas temperature at 1 PL HRSG outlet | ° C. | — | 228 | 242 |
| Electric output of steam bottoming cycle | MWe | — | 1.01 | 2.11 |
| Inlet pressure of NG supplied | barA | 60 | 60 | 60 |
| NG pressure at liquefier inlet | barA | — | — | 80 |
| Pressure of LNG produced | barA | — | — | 6.0 |
| Power consumed by NG compressor | MWe | — | — | 0.09 |
| Power produced by LNG expander | MWe | — | — | 0.03 |
| Power consumed by exhaust tan | MWe | — | — | 0.09 |
| SC/CC/PG plant electric output | MWe | 9.73 | 10.74 | 9.73 |
| Mole composition of exhaust gases, as refrigerant: | | | | |
| N2 | % | — | — | 81.9 |
| Ar | % | — | — | 1.0 |
| O2 | % | — | — | 12.2 |
| CO2 | % | — | — | 4.9 |
| Hourly LNG co-production rate | t/h | — | — | 4.92 |
| Specific LNG co-production | t/MWh | — | — | 0.51 |
| Annual total LNG co-production at 8322 h/y | kton/y | — | — | 40.9 |
| NG liquefaction rate | % | — | — | 76.0 |
| Plant output: SC/CC/PG (re-counted) | MWe | 9.73 | 10.74 | 13.69 |
| Plant efficiency: SC/CC/PG (re-counted) | % | 46.3 | 51.1 | 65.1 |
| Referenced LNG plant capacity | t/h | | | 4.92 |
| Specific power consumption at referenced plant | kWh/t | | | 804 |
| Alt. 1   Power consumption from the grid | MWe | | | 3.96 |
| Assumed efficiency of own GT | % | | | 31.0 |
| Alt 2   Share of delivered NG consumed by GT | % | | | 18.2 |

TABLE 4

| Parameters | Unit | GE PG | GE PG | GE PG |
|---|---|---|---|---|
| Exhaust gases temperature at HRSG inlet | ° C. | 595 | 645 | 695 |
| Steam bottoming cycle power output | MWe | 2.69 | 3.25 | 3.76 |
| LP air flowrate at compressor outlet | kg/s | 21.0 | 26.0 | 29.7 |
| Mechanical power consumed by LP air compressor | MWm | 3.51 | 4.35 | 4.97 |
| Mechanical power produced by LP expander | MWm | 1.15 | 1.43 | 1.62 |
| Heat input in the duct burner | MWth | 1.07 | 2.04 | 3.04 |
| Heat input in the GE cylinders | MWth | 21.02 | 21.02 | 21.02 |
| Total heat input in the plant | MWth | 22.09 | 23.06 | 24.06 |
| Electrical power produced by GE | MWe | 9.73 | 9.73 | 9.73 |
| PG plant electric output | MWe | 9.80 | 9.75 | 9.78 |
| Mole composition of exhaust gases, as refrigerant: | | | | |
| N2 | % | 81.3 | 80.8 | 80.5 |
| Ar | % | 1.0 | 1.0 | 1.0 |
| O2 | % | 13.5 | 14.7 | 15.4 |
| CO2 | % | 4.2 | 3.5 | 3.1 |

TABLE 4-continued

| Parameters | | Unit | GE PG | GE PG | GE PG |
|---|---|---|---|---|---|
| Hourly LNG co-production rate | | t/h | 5.86 | 7.25 | 8.26 |
| Specific LNG co-production | | t/MWh | 0.60 | 0.75 | 0.85 |
| Annual total LNG co-production at 8322 h/y | | kton/y | 48.8 | 60.3 | 68.7 |
| NG liquefaction rate | | % | 78.2 | 80.9 | 82.3 |
| Share of delivered NG consumed by duct burner | | % | 1.3 | 2.0 | 2.6 |
| Total (re-counted) PG plant power output | | MWe | 14.29 | 14.91 | 15.33 |
| Total (re-counted) PG plant efficiency | | % | 64.7 | 64.7 | 63.7 |
| Referenced LNG plant capacity | | t/h | 5.86 | 7.25 | 8.26 |
| Specific power consumption at referenced plant | | kWh/t | 767 | 712 | 672 |
| Alt. 1 | Power consumption from the grid | MWe | 4.49 | 5.16 | 5.55 |
| | Assumed efficiency of own GT | % | 31.0 | 31.0 | 31.0 |
| Alt. 2 | Share of delivered NG consumed by GT | % | 17.4 | 16.2 | 1.5.4 | enhancement of the specific LNG co-production rate from 0.51 ton/MWh up to 0.60, 0.75 and 0.85 ton/MWh respectively. This is accompanied by an increase in a share of NG liquefied at the plant from 76 to 82%. The self-consumption of an additional fuel used for an increase in LNG co-production rate comprises 1.3-2.6% and is much below an amount of fuel self-consumed at the referenced LNG plants. Thereby, a total fuel conversion efficiency at the GE PG plants with SF remains at a high level of 65-64%, which exceeds the efficiency of the GT PG plants indicated in the Tables 1 and 2 by 5-13 points.

The invented method may be applied to design and operate both the base-load and load-following GE PG plants. In the latter case with decreasing the plant electrical load, a part of the GE power output may be used to drive the LP air compressor and to provide a required amount of the LP air bypassed the GE and HRSG.

As a whole the invented method of exhaust waste energy recovery may be used for liquefaction of any methaneous (MG) fuel at the plants using the gas-fired ICE as the prime movers. These could be, for example, the polygeneration plants, at which the proposed method may be applied to co-produce power and LNG, as described above. These could be also the compressor stations and underground storages, wherein the proposed method may be applied to drive the NG compressors and co-produce the LNG. At the conventional LNG plant with own ICE prime mover the proposed method may be used to drive the refrigerant compressor and to produce up to 30-50% of extra LNG without consumption of an additional fuel and without installation of a supplementary specialized refrigeration equipment.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention.

What is claimed as new is:

1. A method for an exhaust waste energy recovery at an internal combustion engine (ICE) polygeneration plant, comprising in combination:
   supplying said polygeneration plant with a methaneous gas (MG) at a rate exceeding an amount of a fuel required for the ICE operation;
   processing all the supplied MG to meet the parameters and quality standards specific by its following liquefaction;
   selecting a type of the ICE for installation at the polygeneration plant from a group comprising a twin-shaft gas turbine and a lean burn supercharged reciprocating gas engine;
   supplying the polygeneration plant with an atmospheric air which is at least partially used as a combustion air in a selected ICE;
   pressurizing the combustion air with use of at least one compression means so providing a high pressure (HP) combustion air required for operation of the selected ICE;
   burning a mixture of said fuel with the HP combustion air and following expanding a formed combustion gas down to a low-pressure (LP) in said selected ICE, resulting in producing a first part of a gross power output of said polygeneration plant and releasing a low-pressure (LP) exhaust gases stream comprising a mixture of nitrogen, oxygen, carbon dioxide and water vapor at a high temperature;
   recovering an exhaust waste energy through producing the remainder of the gross power output of said polygeneration plant, converting the LP exhaust gases stream into a useful refrigerant and using said refrigerant for producing a liquefied MG (LMG) co-product from a major part of a processed MG;
   harnessing a minor non-liquefied part of the processed MG as the fuel for the selected ICE;
   providing a net power output of the polygeneration plant at a level which is equal to or above a power output of the selected ICE operated in a simple cycle mode; and
   providing a power output of the polygeneration plant re-counted with consideration of a power equivalent of the LMG co-product at a level which is above a power output of the selected ICE operated in a conventional combined cycle mode.

2. A method as in claim 1, wherein said processing the supplied MG comprises the following steps:
   dehydration of the supplied MG;
   reducing a carbon dioxide content in the supplied MG down to a level selected in accordance with a rated pressure of said LMG co-product;
   selecting a value of a high pressure (HP) of the supplied MG prior to its liquefaction with regard to a pressure value of said LP exhaust gases stream released from the ICE;
   on-demand compressing the supplied MG up to the selected HP value, resulting in forming a HP MG stream; and
   pre-cooling said HP MG stream prior to its liquefying.

3. A method as in claim 1, wherein producing the LMG co-product comprises the following steps:

liquefying the whole of said HP MG stream with use of the refrigerant formed from the LP exhaust gases stream, resulting in formation of a high-pressure liquefied MG (HP LMG) stream;

two-stage depressurizing the HP LMG stream down to the rated pressure of the LMG co-product, resulting in forming a two-phase MG gas stream at said rated pressure;

separating said two-phase MG gas stream into a vapor MG stream and a liquefied MG stream;

using said vapor MG stream, as the non-liquefied part of the processed MG, for said pre-cooling the HP MG stream and fueling the ICE; and using said liquefied MG stream as the LMG co-product of the polygeneration plant.

4. A method as in claim 1, wherein the following processes are performed in deciding on the twin-shaft gas turbine as the ICE for the polygeneration plant:

supplying the polygeneration plant with the atmospheric air which is pressurized up to a high pressure (HP) by a turbine compressor and completely used as a HP combustion air in said gas turbine;

supplying the turbine combustor with the non-liquefied part of the processed MG as the fuel for the gas turbine;

burning a mixture of said fuel and the HP combustion air in a turbine combustor with generating a combustion gases stream escaped the turbine combustor at the HP and a top cycle temperature;

expanding the combustion gases down to a low pressure (LP) in the HP turbine expander, resulting in producing said first part of the gross power output of said polygeneration plant which is fully consumed by said turbine compressor;

releasing the LP exhaust gases stream from the HP turbine expander at the high temperature;

recovering a thermal energy of the LP exhaust gases stream in a heat recovery steam generator (HRSG) of a steam bottoming cycle, resulting in producing a second part of the gross power output of said polygeneration plant; and recovering a pressure energy of the LP exhaust gases stream in a LP expander, being performed as a part of converting the LP exhaust gases stream into the useful refrigerant and resulting in production of a third part of the gross power output of said polygeneration plant.

5. A method as in claim 1, wherein the following processes are performed in deciding on the lean burn supercharged reciprocating gas engine as the ICE for the polygeneration plant:

supplying the polygeneration plant with the atmospheric air which is pressurized up to a low pressure (LP) by a separate LP air compressor;

using a major part of a LP atmospheric air as a LP combustion air for said gas engine;

supplying the gas engine with the non-liquefied part of the processed MG as the fuel for the gas engine;

mixing the LP combustion air with said fuel and their following compressing in the gas engine up to a high pressure (HP);

burning a HP mixture of said fuel and combustion air in said gas engine, resulting in generating a combustion gas at a top cycle pressure and a top cycle temperature;

expanding the combustion gas in the gas engine down to a low pressure (LP), resulting in producing said first part of the gross power output of said polygeneration plant and releasing the LP exhaust gases stream from the gas engine at the high temperature;

recovering a thermal energy of the LP exhaust gases stream in the HRSG of the steam bottoming cycle, resulting in producing the second part of the gross power output of said polygeneration plant;

mixing the LP exhaust gases stream escaped said HRSG with a minor part of the LP atmospheric air escaped said LP air compressor, resulting in forming a LP gaseous stream;

recovering a pressure energy of the LP gaseous stream in a LP expander, being performed as a part of converting the LP gaseous stream into the useful refrigerant and resulting in production of the third part of the gross power output of said polygeneration plant; and consuming the second and third parts of the gross power output of said polygeneration plant for driving said LP air compressor.

6. A method as in the claim 4, wherein said converting the LP exhaust gases stream into the useful refrigerant comprises the following steps:

cooling the LP exhaust gases stream escaped said HRSG by the water or atmospheric air with draining a formed condensate;

drying the LP exhaust gases stream, resulting in capturing a water vapor in a pressure swing adsorber, and following chilling a dried LP exhaust gases stream below 0° C. in a cold regenerator so, forming a dried and chilled LP exhaust gases stream upstream of said LP expander;

said expanding the dried and chilled LP exhaust gases stream in the LP expander, resulting in forming a deeply cooled non-pressurized exhaust gases stream, as the useful refrigerant, at the outlet of said LP expander;

recovering a cold thermal energy of said refrigerant first for the producing the LMG co-product and then for said chilling the dried LP exhaust gases stream in the cold regenerator;

using said refrigerant escaped the cold regenerator for removing the captured water vapor from the pressure swing adsorber; and exhausting the refrigerant together with the water vapor through use of an exhaust fan.

7. A method as in the claim 5, wherein said converting the LP gaseous stream into the useful refrigerant comprises the following steps:

cooling the LP gaseous stream by the water or atmospheric air with draining a formed condensate;

drying the LP gaseous stream with capturing a water vapor in a pressure swing adsorber and following chilling a dried LP gaseous stream below 0° C. in a cold regenerator so, forming a dried and chilled LP gaseous stream upstream of said LP expander, said expanding the dried and chilled LP gaseous stream in the LP expander, resulting in forming a deeply cooled non-pressurized gaseous stream, as the useful refrigerant, at the outlet of said LP expander, recovering a cold thermal energy of said refrigerant first for the producing the LMG co-product and then for said chilling the dried LP gaseous stream in the cold regenerator;

using said refrigerant escaped the cold regenerator for removing the captured water vapor from the pressure swing adsorber; and exhausting the refrigerant together with the water vapor using an exhaust fan.

8. A method as in the claim 5, wherein an enhanced yield of the LMG co-product of the polygeneration plant with the gas engine, as the selected ICE, is achieved by increasing a flowrate of the refrigerant and performed through combination of the following processes:

supplementary firing an additional fuel in the LP exhaust gases stream ahead of the HRSG;

increasing a steam capacity of the HRSG, resulting in producing an extra power by a steam turbine of the steam bottoming cycle;

increasing a flowrate value of said minor part of the LP atmospheric air produced by the LP air compressor and mixed with the LP exhaust gases stream escaped the HRSG;

increasing a flowrate value of the dried and chilled LP gaseous stream at the inlet of the LP expander, resulting in producing an extra power by said LP expander;

increasing a flowrate value of the deeply cooled non-pressurized gaseous stream, as the useful refrigerant, at the outlet of said LP expander; and serving the enhanced needs of the LP air compressor for a power input through using the extra power produced by the steam turbine and LP expander.

\* \* \* \* \*